(12) United States Patent
Kurokawa et al.

(10) Patent No.: US 7,503,575 B2
(45) Date of Patent: Mar. 17, 2009

(54) BODY FRAME OF TWO-WHEELED VEHICLE

(75) Inventors: Nobuhiko Kurokawa, Aioi (JP); Yoshihiro Masuda, Kobe (JP); Takehiro Nakashima, Akashi (JP); Akira Takasu, Akashi (JP); Toshiyuki Miyake, Miki (JP); Kaoru Sugita, Fuji (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 334 days.

(21) Appl. No.: 11/319,013

(22) Filed: Dec. 27, 2005

(65) Prior Publication Data

US 2006/0157955 A1  Jul. 20, 2006

(30) Foreign Application Priority Data

Dec. 27, 2004  (JP) .............................. 2004-376313

(51) Int. Cl.
 *B62K 19/32* (2006.01)
(52) U.S. Cl. ..................................... 280/279; 280/281.1
(58) Field of Classification Search .............. 280/281.1, 280/279, 280; 180/219
See application file for complete search history.

(56) References Cited

U.S. PATENT DOCUMENTS 3,889,975 A * 6/1975 Falconi .................... 280/281.1

| | | | | |
|---|---|---|---|---|
| 4,479,662 A * | 10/1984 | Defour et al. | ............ | 280/281.1 |
| 5,253,890 A * | 10/1993 | Takamiya et al. | ......... | 280/281.1 |
| 5,445,400 A * | 8/1995 | Martin et al. | ............ | 280/281.1 |
| 5,857,690 A * | 1/1999 | Gueugneaud | ............ | 280/281.1 |
| 6,742,796 B2 * | 6/2004 | Ho et al. | .................. | 280/281.1 |
| 7,052,028 B2 * | 5/2006 | Chamberlain | ............... | 280/279 |

FOREIGN PATENT DOCUMENTS

JP  62-162182  10/1987
JP  2004-256073  9/2004

* cited by examiner

*Primary Examiner*—Kevin Hurley
(74) *Attorney, Agent, or Firm*—Alleman Hall McCoy Russell & Tuttle LLP (57) ABSTRACT

A body frame of a two-wheeled vehicle. The body frame typically includes a head pipe to which a steering shaft extending substantially vertically is rotatably mounted. The head pipe includes an upper head pipe and a lower head pipe that are configured to be molded and to be coupled to each other. The upper head pipe includes an upper tubular portion into which the steering shaft is inserted and a main frame tongue portion that is configured to extend rearward from the upper tubular portion and is configured to support a front portion of the main frame from above. The lower head pipe includes a lower tubular portion into which the steering shaft is inserted and a down tube tongue portion that is configured to extend downward from the lower tubular portion and to support an upper portion of the down tube from forward.

8 Claims, 8 Drawing Sheets

PRIOR ART

FIG. 8

BODY FRAME OF TWO-WHEELED VEHICLE

TECHNICAL FIELD

The present invention generally relates to a body frame of a two-wheeled vehicle, and particularly to a body frame having a head pipe that is manufactured by molding, such that the body frame is stiff and lightweight.

BACKGROUND ART

Some body frames of motorcycles include a head pipe to which a steering shaft with a steering handle attached to an upper portion thereof is rotatably mounted, a main frame extending rearward from the head pipe, a down tube extending downward from the head pipe, a lower frame extending substantially rearward from a lower end portion of the down tube, and a pivot frame (also referred to as a swing arm bracket) that extends downward from a rear end portion of the main frame and is coupled at a lower end portion thereof to a rear end portion of the lower frame. The main frame in some cases includes a pair of right and left frame members.

An engine is mounted into an inner space of the body frame defined by the main frame, the pivot frame, the down tube, and the lower frame by a number of brackets. A straddle seat is mounted over the main frame. Straddling the seat, a rider steers the motorcycle. A fuel tank is disposed above the main frame and in front of the seat. Since a load of the engine, the fuel tank, and a rider is applied to the body frame and a vertical impact or a torsional force is externally applied to the body frame during travel of the motorcycle, the body frame is required to have high stiffness. Since the head pipe of the body frame is more likely to be subjected to the load, the impact, and the external force, it is required to have sufficient stiffness. Furthermore, it is necessary to firmly couple the head pipe, the main frame, and the down tube to each other.

Figure 8:
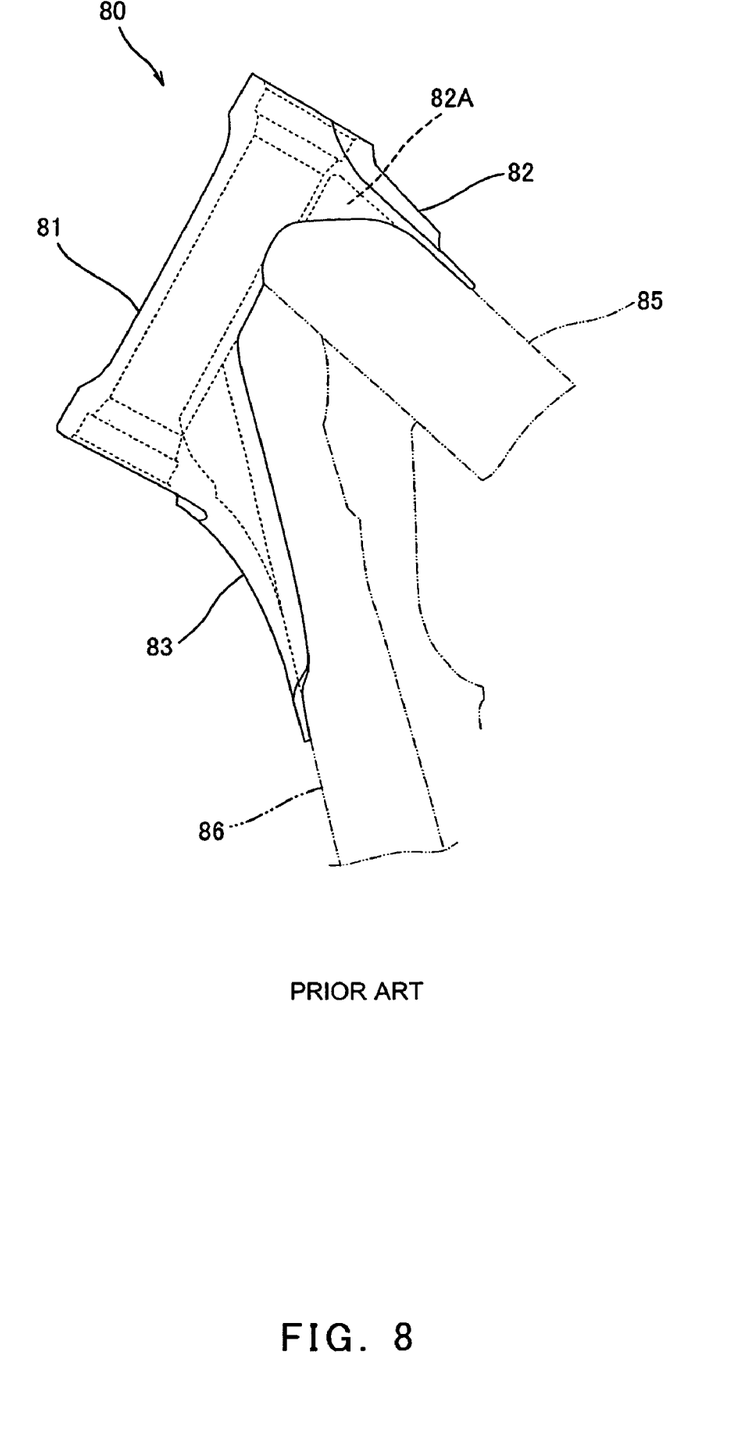
FIG. 8 is a side view showing a structure of the conventional head pipe.

For example, Japanese Utility Model Application Publication No. Sho. 62-162182 and Japanese Laid-Open Patent Application Publication No. 2004-256073 disclose a head pipe that is manufactured by forging to have a shape that enables a head pipe, a main frame, and a down tube to be coupled firmly to each other. As shown in FIG. 8, a conventional head pipe 80 includes a tubular shaft support portion 81 to which a steering shaft is rotatably mounted, a main frame tongue portion 82 configured to extend substantially rearward from an upper portion of the shaft support portion 81, and a down tube tongue portion 83 configured to extend substantially downward from a lower portion of the shaft support portion 81, and is manufactured by forging.

A main frame 85 is welded to the head pipe 80 with an upper surface of a front portion thereof in contact with a lower surface of the main frame tongue portion 82 of the head pipe 80 and a front end portion thereof in contact with a rear surface of the shaft support portion 81 of the head pipe 80. A down tube 86 is welded to the head pipe 80 with a front surface of an upper portion thereof in contact with a rear surface of the down tube tongue portion 83 of the head pipe 80 and an upper end portion thereof in contact with a rear surface of the shaft support portion 81 of the head pipe 80. The head pipe 80, the main frame 85 and the down tube 86 are firmly coupled to each other with a sufficiently long weld length.

In the conventional head pipe 80 illustrated in FIG. 8, the main frame tongue portion 82 and the down tube tongue portion 83 are forged by using a die divided into right and left parts or front and rear parts. In this case, however, the main frame tongue portion 82 has an unwanted thick region (e.g., region 82A in FIG. 8), increasing the weight of the body frame. For this reason, a process for cutting the thick region 82A to reduce weight of the head pipe 80 becomes necessary.

SUMMARY OF THE INVENTION

The present invention addresses the above described conditions, and an object of the present invention is to provide a body frame of a two-wheeled vehicle having a head pipe that is manufactured by molding to have suitable stiffness and be lightweight without unduly burdensome manufacturing processes.

According to the present invention, there is provided a body frame of a two-wheeled vehicle comprising a head pipe to which a steering shaft extending substantially vertically is rotatably mounted, the head pipe being configured to support a front portion of a main frame extending substantially forward and rearward of a vehicle body of the two-wheeled vehicle and to support an upper portion of a down tube extending substantially vertically, the head pipe including an upper head pipe disposed on an upper side in an axial direction of the steering shaft, and a lower head pipe disposed on a lower side in the axial direction of the steering shaft, the upper head pipe and the lower head pipe being configured to be molded and to be coupled to each other, wherein the upper head pipe includes an upper tubular portion into which the steering shaft is inserted and a main frame tongue portion that is configured to extend rearward from the upper tubular portion and is configured to support a front portion of the main frame from above, and wherein the lower head pipe includes a lower tubular portion into which the steering shaft is inserted and a down tube tongue portion that is configured to extend downward from the lower tubular portion and to support an upper portion of the down tube from forward.

Since the upper head pipe that supports the front portion of the main frame from above and the lower head pipe that supports the down tube from forward are separately molded and are coupled to each other, a frame that has stiffness and is lightweight is easily achieved.

The frame tongue portion may have a concave portion that is recessed upward at a lower region thereof. This makes it possible to remove unwanted thick regions from the main frame tongue portion, and thus to achieve light weight. When the upper head pipe is forged by using a die divided into upper and lower parts, the concave portion recessed upward is formed by the forging. Therefore, the head pipe is able to achieve light weight without cutting the thick region.

The main frame may include a pair of a left main frame member and a right main frame member. The main frame tongue portion of the upper head pipe may include a left frame tongue portion that is configured to support the left main frame member from above, a right frame tongue portion that is configured to support the right main frame member from above, and an inner frame support portion that extends downward from a region between the left frame tongue portion and the right frame tongue portion and is configured to support the left main frame member and the right main frame member from inward in rightward and leftward (lateral) direction of the two-wheeled vehicle. With such a construction, the main frame including the left main frame member and the right main frame member and the upper head pipe are coupled to each other more firmly. Since the inner frame support portion extending downward is forged by using, for example, a die divided into upper and lower parts, stiffness of the inner frame support portion improves and manufacturing steps and manufacturing cost are reduced.

The down tube tongue portion of the lower head pipe may have a horizontal cross-section that is channel-shaped to be recessed forward so as to cover an upper portion of the down tube in a direction from forward and from lateral. With such a construction, the down tube and the lower head pipe are coupled to each other more firmly. The down tube tongue portion is forged by using, for example, a die divided into front and rear parts.

The lower head pipe may be provided with outer main frame support portions at a left region and a right region of an upper portion thereof, the outer main frame support portions being configured to extend rearward and upward from the lower head pipe so as to cover a front end portion of the main frame from outward in the rightward and leftward (lateral) direction. With such a construction, the main frame and the head pipe are coupled to each other more firmly. In addition, the outer main frame support portion may be forged by using, for example, the die divided into front and rear parts.

The upper head pipe may have a taper portion at an outer peripheral region of a lower end portion thereof and the lower head pipe has a taper portion at an outer peripheral region of an upper end portion thereof, and the taper portions may be configured to be welded to each other with the upper end portion of the lower head pipe coupled to the lower end portion of the upper head pipe. With such a construction, since the upper head pipe and the lower head pipe are coupled to each other firmly, the head pipe is able to have stiffness.

The above and further objects and features of the invention will more fully be apparent from the detailed description with accompanying drawings.

DETAILED DESCRIPTION

Figure 1:
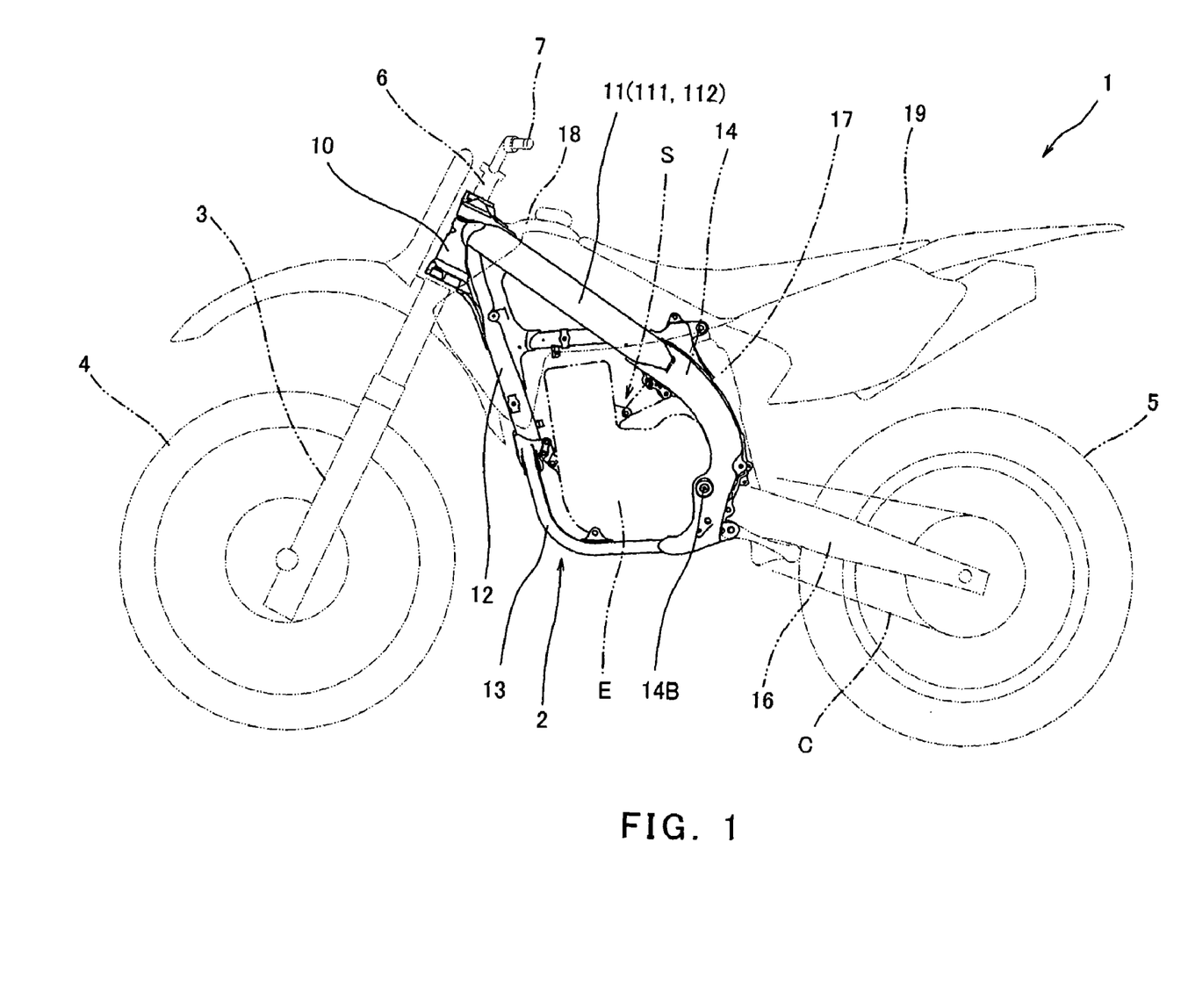
FIG. 1 is a side view of a motocross motorcycle comprising a body frame according to an embodiment of the present invention.
Figure 2:
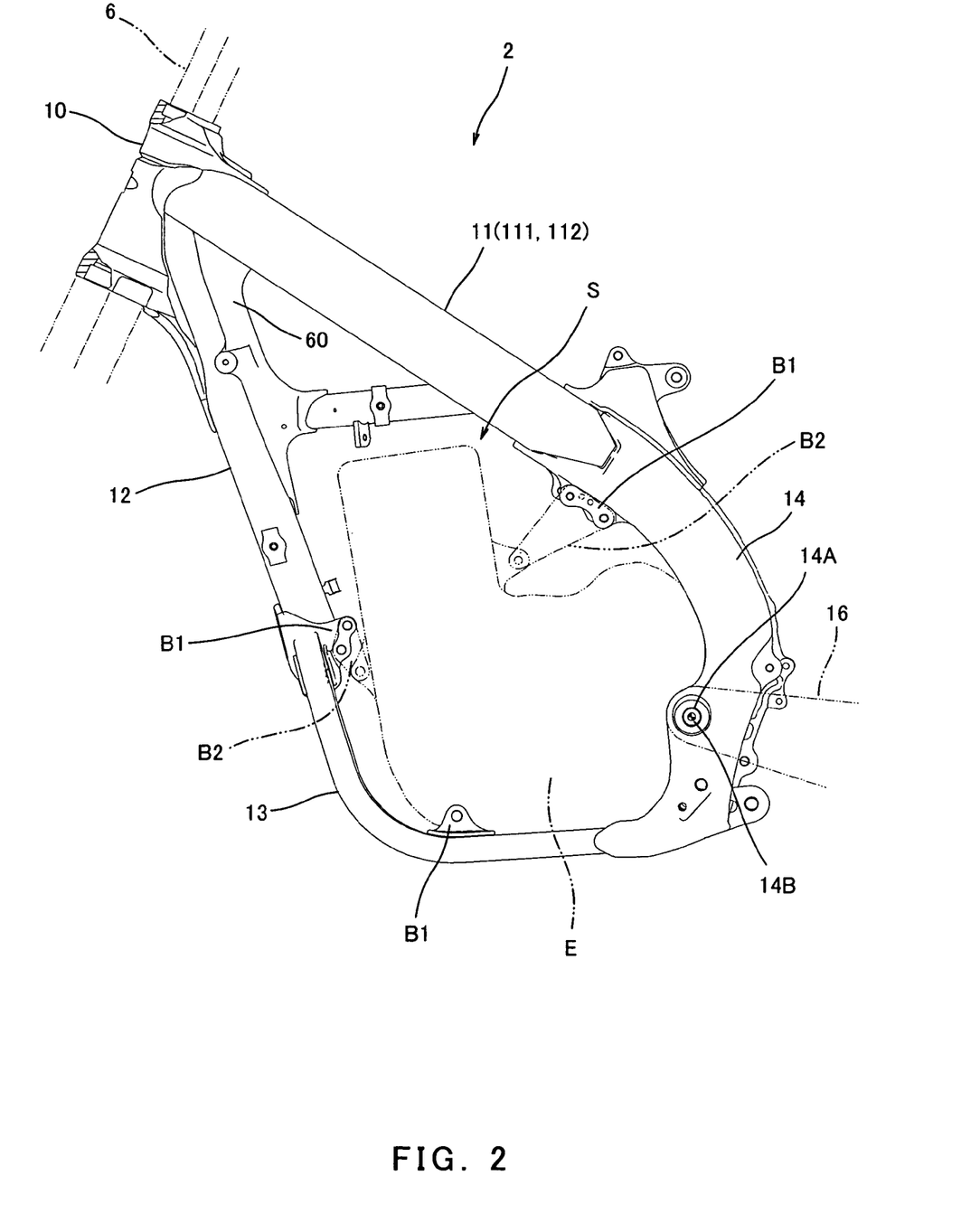
FIG. 2 is a side view of the body frame equipped in the motorcycle of FIG. 1.

Hereinafter, a head pipe of a body frame of a motorcycle according to an embodiment of the present invention will be described with reference to the drawings. FIG. 1 is a side view of a motocross motorcycle 1. FIG. 2 is a side view of a body frame 2 of the motorcycle 1 of FIG. 1. In FIG. 1, the body frame 2 is illustrated by a solid line and the other parts are illustrated by two-dotted lines. As used herein, the direction is defined from the perspective of a rider (not shown) straddling the motorcycle 1.

Turning now to FIG. 1, the motorcycle 1 comprises a front fork 3 extending substantially vertically with a predetermined caster angle. A front wheel 4 which is a steering wheel is rotatably mounted to a lower portion of the front fork 3. A lower portion of the steering shaft 6 extending substantially vertically is coupled to an upper portion of the front fork 3. A bar-type steering handle 7 extending rightward and leftward (laterally) is attached at a center region thereof to an upper portion of the steering shaft 6. The body frame 2 includes a head pipe 10, a main panel 11, a down tube 12, a lower frame 13, and a pivot frame (also referred to as a swing arm bracket) 14. The main frame 11 extends rearward and slightly downward from an upper portion of the head pipe 10. The steering shaft 6 is rotatably mounted to the head pipe 10. The front wheel 4 is caused to turn to the right or to the left by the rider's operation of rotating the steering handle 7 to the right or to the left.

Figure 5:
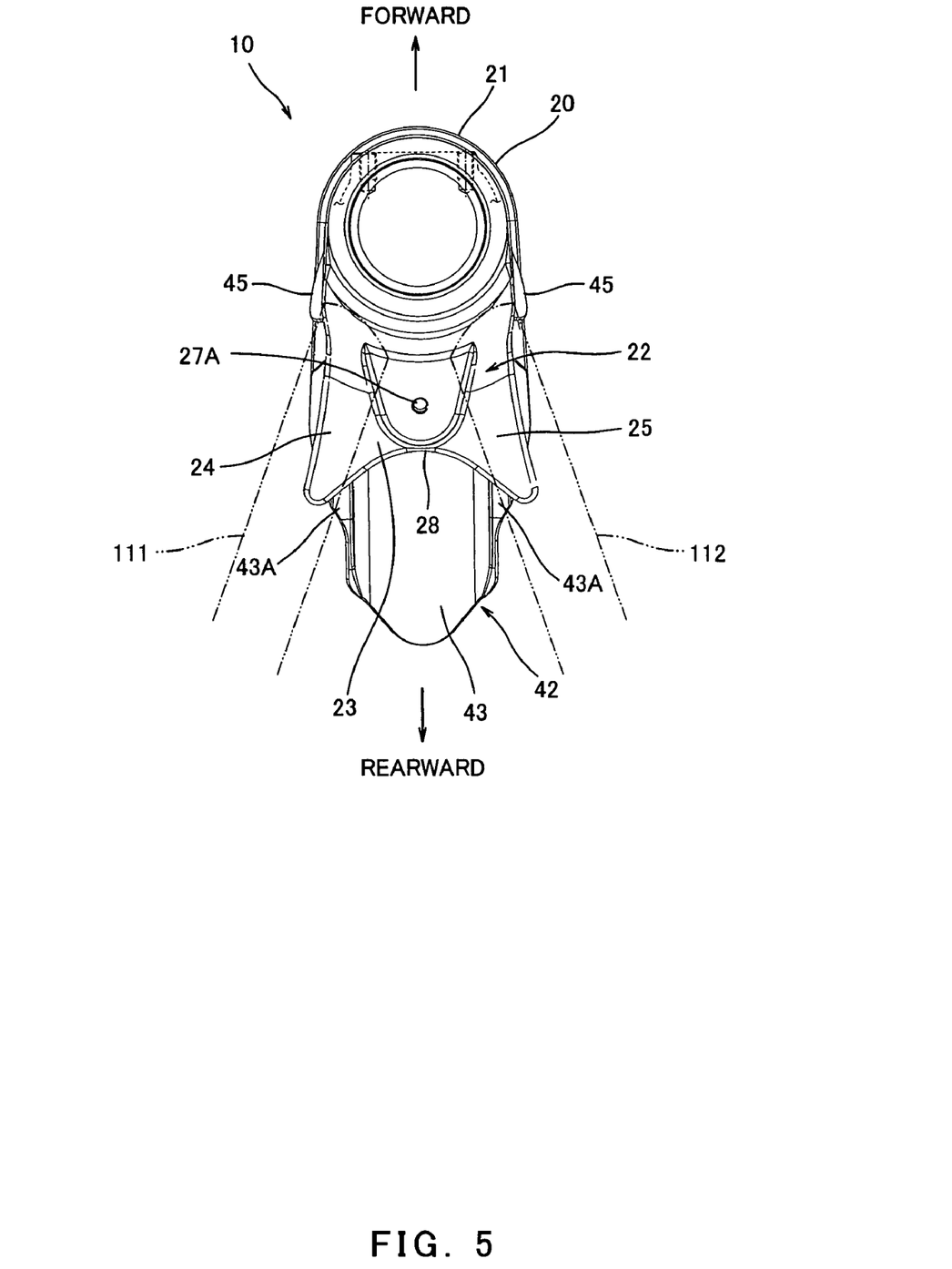
FIG. 5 is a front view showing a structure of the head pipe of FIG. 3, as viewed in the direction of arrow V.

As shown in FIGS. 1 and 2, the main frame 11 includes a pair of a left main frame member 111 and a right main frame member 112 (only the left main frame member 111 is illustrated in FIGS. 1 and 2, and the right main frame member 112 is illustrated in FIG. 5). The down tube 12 extends downward and rearward from a lower portion of the head pipe 10. The lower frame 13, including a pair of a left lower frame member and a right lower frame member (only the left lower frame member 13 is illustrated in FIGS. 1 and 2), extends from a lower portion of the down tube 12. The lower frame members extend substantially downward from a lower portion of the down tube 12 with a distance in a rightward and leftward (lateral) direction that increases in a downward direction and then are curved to extend rearward. A pivot frame 14 is coupled to a rear portion of the lower frame 13 and to a rear portion of the main frame 11.

As shown in FIG. 2, a pivot hole 14A is formed at a location which is slightly lower than a center in a vertical direction of pivot frame 14. A swing arm 16 extends substantially forward and rearward and is coupled to the pivot frame 14 at a front end portion thereof to be pivotable around a pivot 14B inserted into the pivot hole 14A. As shown in FIG. 1, a rear wheel 5 which is a drive wheel is mounted rotatably to a rear portion of the swing arm 16 which is vertically pivotable around the pivot 14B. As shown in FIG. 1, a suspension unit 17 is disposed between an upper portion of the pivot frame 14 and the swing arm 16. The suspension unit 17 is configured to apply a force to bias the swing arm 16 downward.

As shown in FIGS. 1 and 2, an engine E is mounted in a space S defined by the head pipe 10, the main frames 11, the down tube 12, the lower frames 13, and the pivot frame 14. The engine E is a four-cylinder four-cycle engine in this embodiment. The engine E is mounted to the body frame 2 by a plurality of brackets B1 and other brackets B2 (see FIG. 2). As shown in FIG. 1, an output shaft (not shown) of the engine E is coupled to the rear wheel 5 through a chain C. A drive force of the engine E is transmitted to the rear wheel 5 through the chain C, thereby generating a power to move the motorcycle 1.

As shown in FIG. 1, a fuel tank 18 is disposed above the main frame 1 and behind the steering shaft 6. A seat 19 which is straddled by the rider is disposed behind the fuel tank 18.

Figure 3:
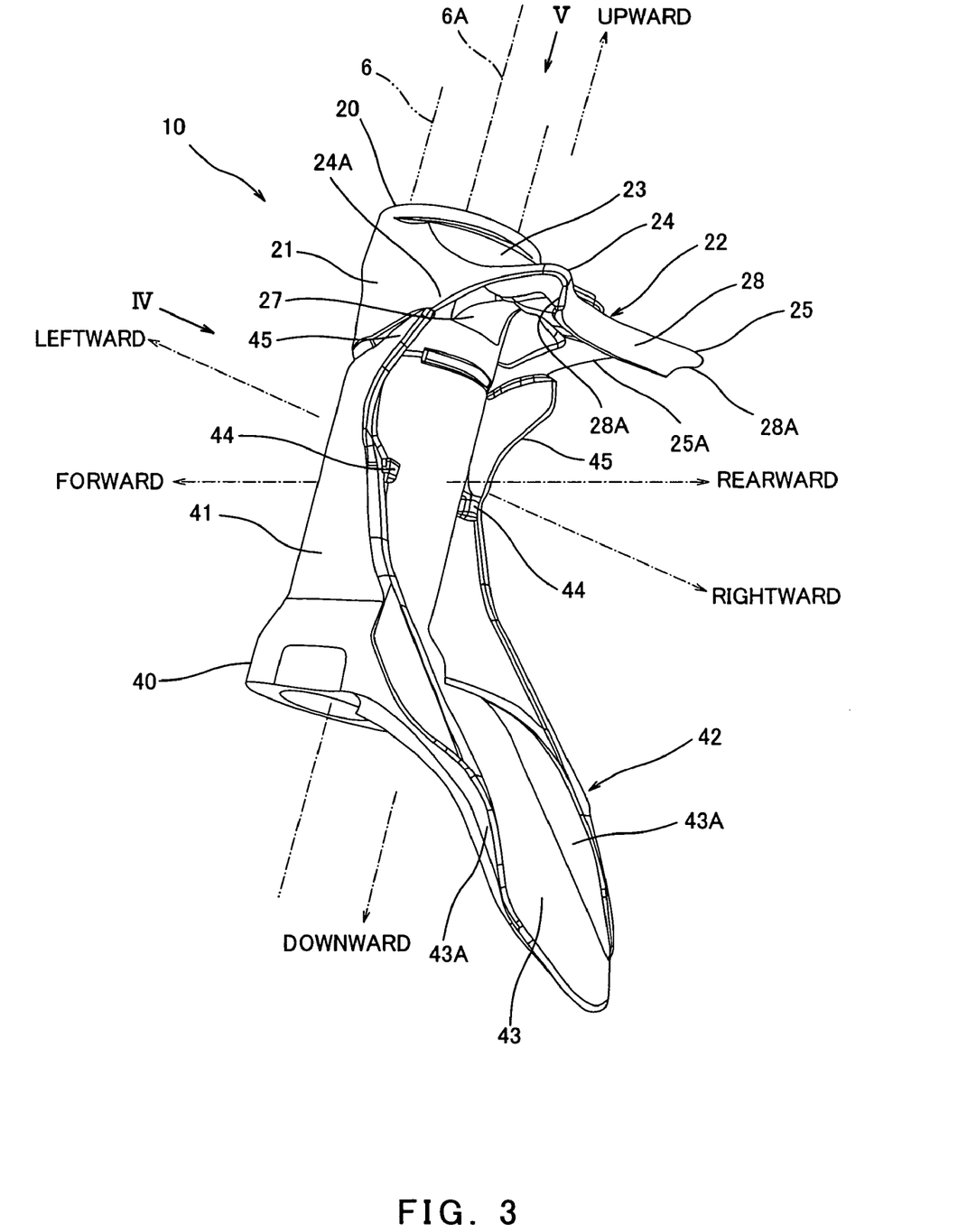
FIG. 3 is a perspective view showing a structure of a head pipe of the body frame of FIG. 2.
Figure 4:
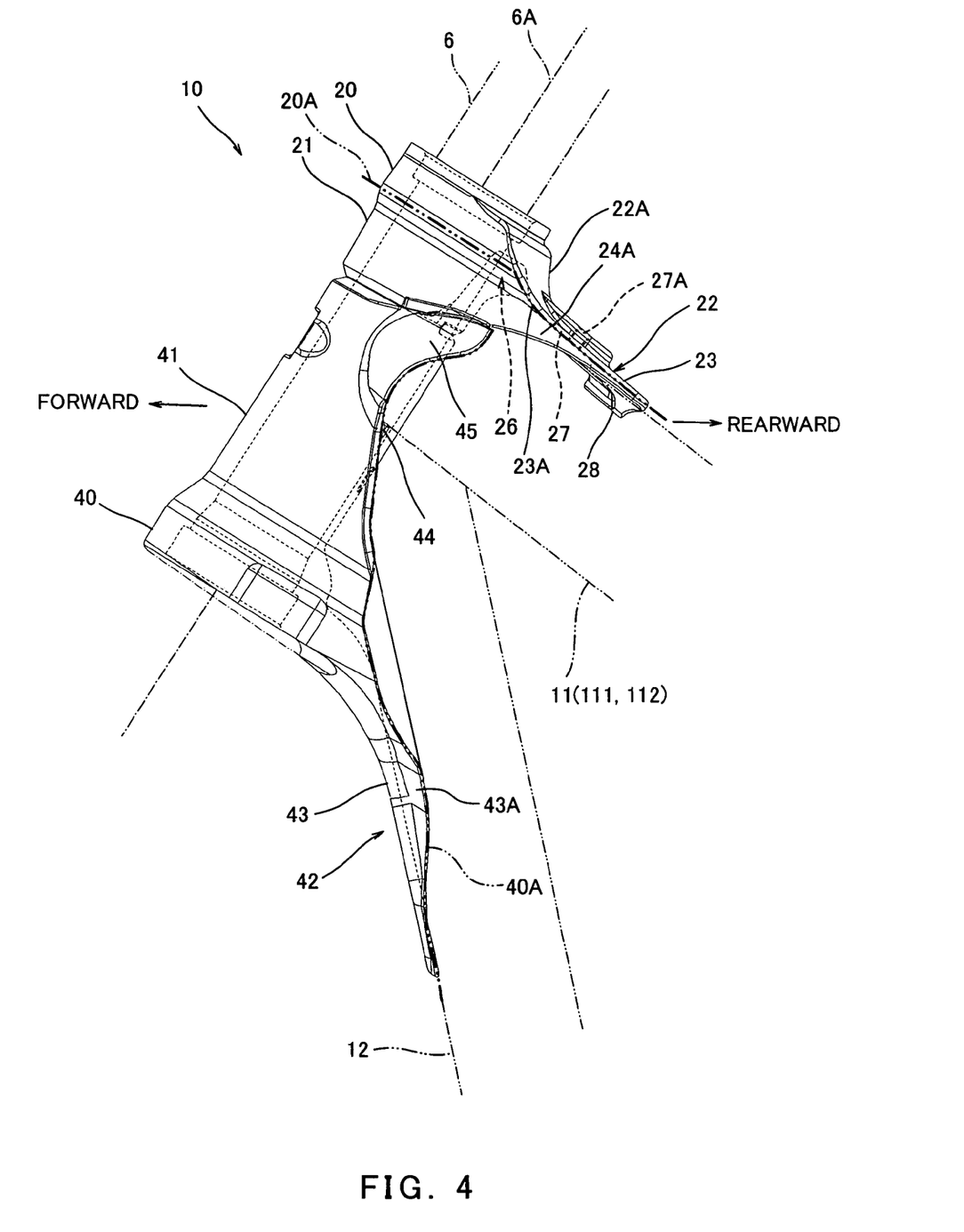
FIG. 4 is a side view showing a structure of the head pipe of FIG. 3, as viewed in the direction of arrow IV in FIG. 3.

FIG. 3 is a perspective view showing a structure of the head pipe 10 of the body frame 2 of FIG. 2. FIG. 4 is a side view showing a structure of the head pipe 10 of FIG. 3, as viewed in the direction of arrow IV in FIG. 3. FIG. 5 is a plan view showing a structure of the head pipe 10 of FIG. 3, as viewed in the direction of arrow V.

Turning to FIG. 3, the head pipe 10 includes an upper head pipe 20 and a lower head pipe 40 that are coupled to each other. The upper head pipe 20 includes an upper tubular portion 21 configured to support the steering shaft 6 inserted thereinto, and a main frame tongue portion 22 that extends rearward and slightly downward from a rear portion of the upper tubular portion 21 and covers the main frame 11 from above (see FIG. 4). The main frame tongue portion 22 is of a flat plate shape extending in a direction substantially perpendicular to a center axis 6A of the steering shaft 6 inserted into the upper tubular portion 21.

As shown in a side view of FIG. 4, the main frame tongue portion 22 includes an upper tongue portion 23 of a flat plate shape. The upper tongue portion 23 has a width (see FIG. 5) substantially equal to that of the upper tubular portion 21. The upper tongue portion 23 extends downward from a region near an upper end of the upper tubular portion 21 and then is curved to extend downward and rearward, i.e., along the direction in which the main frame 11 extends. As shown in a plan view of FIG. 5, the upper tongue portion 23 includes a left rear end portion and a right rear end portion that are configured to extend downward and rearward further than a center region of a rear end portion with a distance that increases in the rightward and leftward (lateral) direction to form a left frame tongue portion 24 and a right frame tongue portion 25. The left frame tongue portion 24 and the right frame tongue portion 25 cover the left main frame member 111 and the right main frame member 112 of the main frame 11 from above.

As shown in FIGS. 3 and 4, a left upper tongue portion side wall 24A and a right upper tongue portion side wall 24B extend downward from a left side portion and a right side portion of the upper tongue portion 23, respectively. The upper tongue portion side walls 24A and 25A extend forward along the upper tongue portion 23 from a region near a rear end portion of the upper tongue portion 23 to a side portion of the upper tubular portion 21. The upper tongue portion side walls 24A and 25A extend with a vertical dimension that increases in a forward direction from the region near the rear end portion of the upper tongue portion 23. The left upper tongue portion side wall 24A and the right upper tongue portion side wall 25A cover the left main frame member 111 and the right main frame member 112, respectively, from a respective outer side in rightward and leftward (lateral) directions, and lower end portions of the upper tongue portion side walls 24A and 25A are configured to contact outer peripheral regions of the left main frame member 111 and the right main frame member 112, respectively (see FIG. 4).

Figure 6:
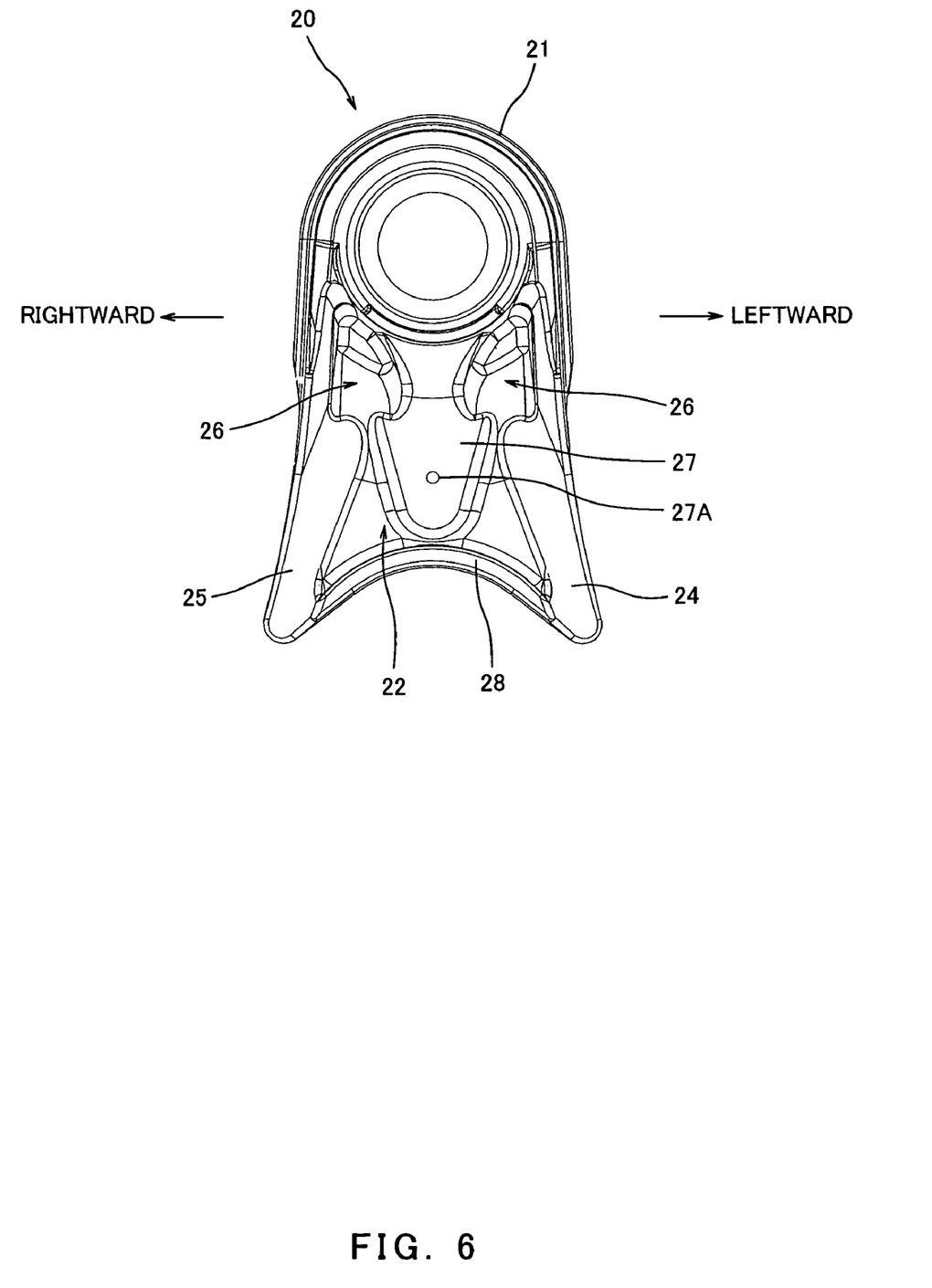
FIG. 6 is a bottom view of an upper head pipe of the head pipe of FIG. 3.

As indicated by a broken line in FIG. 4, concave portions 26 that are recessed upward are formed on a lower portion of the main frame tongue portion 22. A structure of the lower portion of the main frame tongue portion 22 will be described with reference to the bottom view of FIG. 6. As shown in FIGS. 3 and 6, a rib 27 is formed at a center in a width direction of the lower portion of the main frame tongue portion 22. The rib 27 has a thickness larger than that of right and left regions of the lower portion of the main frame tongue portion 22 and protrude downward further than the right and left regions, so that the right and left regions are recessed upward relative to the rib 27, thus forming the concave portions 26. As shown in FIG. 4, the concave portion 26 is formed to recess upward from an undersurface 23A of the upper tongue portion 23 so as to partially conform in shape to an upper face of a curved portion 22A of the upper tongue portion 23 in a side view. As shown in FIGS. 4 and 5, a threaded hole 27A is formed at the upper tongue portion 23 so as to penetrate the rib 27 to allow the fuel tank 18 (see FIG. 1) to be mounted thereby.

As shown in FIGS. 3 and 4, an inner frame support portion 28 extends downward from a rear end portion of the upper tongue portion 23 and is configured to support the left main frame member 111 and the right main frame member 112 from a respective inward side in the a lateral direction. As shown in FIGS. 3 and 5, the inner frame support portion 28 extends in a convex strip shape laterally from a region inwardly adjacent the tip of the rear end portion of the left frame tongue portion 24 to a region inwardly adjacent the tip of the rear end portion of the right frame tongue portion 25. Cut portions 28A of a circular arc shape are formed at a left end portion and a right end portion of the inner frame support portion 28 so as to conform in shape to an outer periphery of the left main frame member 111 and an outer periphery of the right main frame member 112 (see FIG. 5).

The upper head pipe 20 is forged by using a die (not shown) divided into upper and lower parts. Specifically, the die is divided into upper and lower parts at a parting line 20A indicated by a two-dotted line in FIG. 4. By using the die divided into upper and lower parts, the concave portion 26 recessed upward, the inner frame support portion 28, and other portions are integrally forged to form a unitary piece. As a result, the upper head pipe 20 has stiffness and is lightweight. Further, cutting work for cutting unwanted thick region from the upper head pipe 20 may be omitted.

As shown in FIG. 3, the lower head pipe 40 includes a lower tubular portion 41 configured to support the steering shaft 6 inserted thereinto. As shown in FIG. 4, a down tube tongue portion 42 extends downward and slightly rearward from a lower rear portion of the lower tubular portion 41 and is configured to cover the down tube 12 from forward and from lateral.

As shown in FIGS. 3 and 4, the down tube tongue portion 42 includes a lower tongue portion 43 having a width substantially equal to that of the lower tubular portion 41. The lower tongue portion 43 extends downward and rearward from a rear portion of a lower end portion of the lower tubular portion 41 in a side view. Right and left lower tongue portion side walls 43A extend substantially vertically at right and left side portions of the lower tongue portion 43. Each lower tongue portion side wall 43A extends substantially upward along the lower tongue portion 43 from a region near a lower end of the lower tongue portion 43 to a substantially center in the vertical direction of the lower tubular portion 41. Each lower tongue portion side wall 43A has a vertical dimension that increases in an upward direction from the region near the lower end of the lower tongue portion 43 toward the lower tubular portion 41.

The down tube tongue portion 42 including the lower tongue portion 43 and the lower tongue portion side walls 43A is recessed forward and has a channel-shaped cross-section as shown in FIG. 3. The down tube tongue portion 42 supports the down tube 12 (see FIG. 4) so as to cover the down tube 12 from the front and sides. Protrusions 44 are provided at right and left outer peripheral regions at substantially centers in the vertical direction of the lower tubular portion 41 and are configured to protrude from inner faces of the lower tongue portion side walls 43A. The protrusions 44 are configured to contact upper end portions of the down tube 12 that is supported by the down tube tongue portion 42 and to restrict a position of the down tube 12 in forward and rearward direction.

As shown in FIGS. 3 and 4, plate-shaped outer main frame support portions 45 are provided at an upper region of the lower tubular portion 41 and are configured to cover front end portions of the main frames 11 from outer sides in rightward and leftward (lateral) directions. The outer main frame support portions 45 extend rearward and upward from right and left peripheral regions of the upper portion of the lower tubular portion 41. Lower end portions of the outer main frame support portions 45 are formed so as to extend continuously from upper end portions of the lower tongue portion side walls 43A, and upper end portions of the outer main frame support portions 45 are formed along lower end portions of the upper tongue portion side walls 24A and 25A of the main frame tongue portion 22 of the upper head pipe 20.

The lower head pipe 40 is forged by using a die (not shown) divided into front and rear parts. Specifically, this die is divided into the front and rear parts at a parting line 40A indicated by a two-dotted line in FIG. 4. By using the die divided into front and rear parts, the down tube tongue portion 42 that is channel-shaped and recessed forward, and the outer main frame support portions 45 configured to extend rearward and upward from the lower tubular portion 41, are formed integrally by the forging.

The head pipe 10 of this embodiment includes the upper head pipe 20 and the lower head pipe 40 that are separately forged by using the die divided into upper and lower parts and the die divided into front and rear parts, respectively. Since the upper head pipe 20 and the lower head pipe 40 are separately forged, the shapes of these pipes 20 and 40 can be designed more freely. In addition, since the pipes 20 and 40 are forged, they have sufficient strength. Therefore, the head pipe 10 having suitable strength and light weight can be easily achieved by, for example, forming the concave portion 26.

Figure 7:
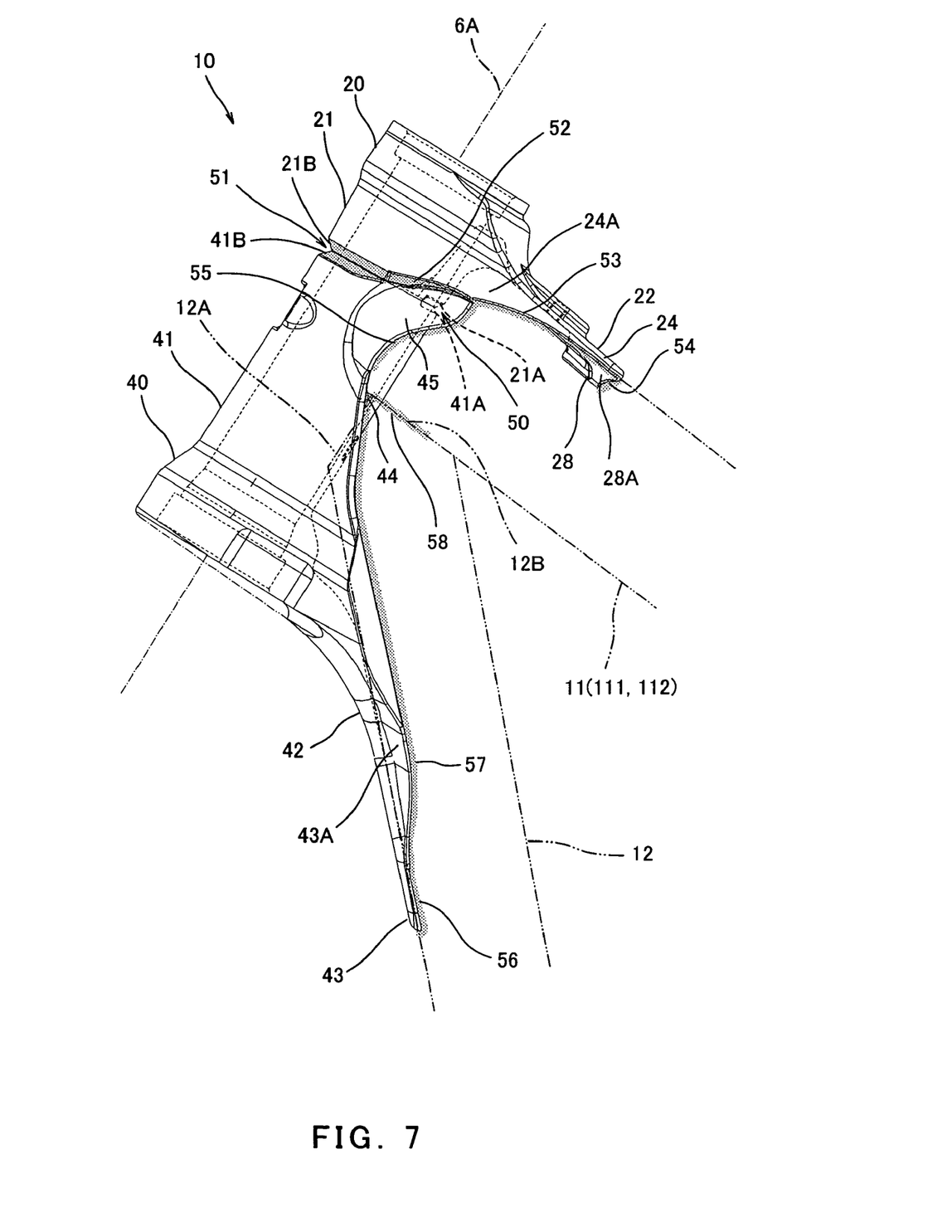
FIG. 7 is a side view showing a connecting configuration of the upper head pipe and a lower head pipe of the head pipe of FIG. 3, and a connecting configuration of the head pipe, a main frame, and the down tube of the body frame of FIG. 3.

FIG. 7 shows a connecting configuration of the upper head pipe 20 and the lower head pipe 40 and a connecting configuration of the main frame 11 and the down tube 12. As shown in FIG. 7, a taper portion (chamfer) 21A is formed at a rear outer peripheral region of the lower end portion of the upper tubular portion 21 of the upper head pipe 20 and a taper portion (chamfer) 41A is formed at a rear outer peripheral region of an upper end portion of the lower tubular portion 41 of the lower head pipe 40. In addition, a taper portion (chamfer) 21B is formed at a front outer peripheral region of the lower end portion of the upper tubular portion 21 and a taper portion (chamfer) 41B is formed at a front outer peripheral region of the upper end portion of the lower tubular portion 41. The taper portions 21A, 21B, 41A and 41B are formed by cutting an outer peripheral portion of the lower end portion of the upper tubular portion 21 and an outer peripheral portion of the upper end portion of the lower tubular portion 41 in a circumferential direction of the upper head pipe 20 and the lower head pipe 40. The taper portions 21A, 21B, 41A and 41B may be formed by or after the forging process.

As shown in FIG. 7, the upper head pipe 20 and the lower head pipe 40 are fixed to each other by a jig (not shown) in such a manner that the upper tubular portion 21 and the lower tubular portion 41 are aligned coaxially with a center axis 6A and a lower end of the upper tubular portion 21 and an upper end of the lower tubular portion 41 are in contact with each other. A region of a lower end of the upper tubular portion 21 and a region of an upper end of the lower tubular portion 41 are welded along a groove 50 with a V-shaped cross-section that is formed by the taper portions 21A and 41A and along a groove 51 with a V-shaped cross-section that is formed by the taper portions 21B and 41B, respectively. In addition, the upper head pipe 20 and the lower head pipe 40 are welded along a connecting line 52 connecting the upper tongue portion side walls 24A and 25A of the main frame tongue portion 22 of the upper head pipe 20 to the outer main frame support portions 45 of the lower head pipe 40. Thus, the upper head pipe 20 and the lower head pipe 40 are firmly coupled to each other. While in this embodiment, a connecting face of the upper tubular portion 21 and the lower tubular portion 41 extends in a direction substantially perpendicular to the center axis 6A, it may alternatively be tilted with respect to the center axis 6A in order to ensure a longer weld length. In a further alternative, the connecting face may have other suitable shapes.

Subsequently, the left main frame member 111 and the right main frame member 112 of the main frame 11 are disposed to extend rearward from a position at which front end portions of the left main frame member 111 and the right main frame member 112 are in contact with rear outer peripheral regions of the head pipe 10 (see FIG. 5). More specifically, the left main frame member 111 is disposed to extend leftward and rearward from a position at which the front end portion of the left main frame member 111 is in contact with rear outer peripheral regions of the upper tubular portion 21 and the lower tubular portion 41. A front portion of the left main frame member 111 is butted against the left frame tongue portion 24 and the upper tongue portion side wall 24A of the main frame tongue portion 22 from above and from the left. Under this condition, the left main frame member 111, the upper tubular portion 21, and the lower tubular portion 41 are fixed to each other by using a jig (not shown).

Likewise, the right main frame member 112 is disposed to extend rightward and rearward from a position at which the front end portion of the right main frame member 112 is in contact with rear outer peripheral regions of the upper tubular portion 21 and the lower tubular portion 41. A front portion of the right main frame member 112 is butted against the right frame tongue portion 25 (see FIG. 3) of the main frame tongue portion 22 and the upper tongue portion side wall 25A (see FIG. 3) from above and from the right. Under this condition, the right main frame member 112, the upper tubular portion 21 and the lower tubular portion 41 are fixed to each other by using a jig (not shown). Thereby, the positions of the left main frame member 111 and the right main frame member 112 in respective rightward and leftward (lateral) directions are restricted by the left cut portion 28A and the right cut portion 28A of the inner frame support portion 28, and the outer main frame support portions 45 of the head pipe 10 (see FIG. 5).

Under this condition, the left main frame member 111 and the right main frame member 112 are welded to the head pipe 10. As shown in FIG. 7, a portion 53 of the left main frame member 111 is welded to the left upper tongue portion side wall 24A along a lower end peripheral region of the upper tongue portion side wall 24A, and a portion 54 of the left main frame member 111 is welded to the inner frame support portion 28 along a circular-arc shaped peripheral region of the left cut portion 28A. Furthermore, a portion 55 of the left main frame member 111 is welded to the outer main frame support portion 45 along a rear end peripheral region of the outer main frame support portion 45. Thereby, the left main frame member 111 and the head pipe 10 are firmly coupled to each other. The right main frame member 112 is welded to the head pipe 10 in the same manner and thereby they are firmly coupled to each other.

As shown in FIG. 7, the down tube 12 is disposed to extend downward along the down tube tongue portion 42 from a position at which an upper end portion of the down tube 12 is in contact with a rear outer peripheral region of the lower tubular portion 41 of the head pipe 10 and a front lower face of the main frame 11. The upper end portion of the down tube 12 extending substantially vertically is shaped such that a front portion and an upper portion of the upper end portion are respectively cut out along planes having angles with respect to the longitudinal direction of the down tube 12. As a result, the upper end portion of the down tube 12 has a first end face 12A extending substantially in parallel with the longitudinal direction of the head pipe 10 and a second end face 12B extending substantially in parallel with the longitudinal direction of the main frame 11 welded to the head pipe 10.

The down tube 12 is guided by the down tube tongue portion 42 with a channel-shaped cross-section and is fitted to the down tube tongue portion 42 from rearward. The down tube 12 is fixed to the down tube tongue portion 42 by using a jig (not shown) with the first end face 12A in contact with a rear outer peripheral region of the lower tubular portion 41 and the second end face 12B in contact with a lower face of the main frame 11. In this state, an upper end of the first end face 12A of the down tube 12 is butted against the protrusion 44 provided at the rear outer peripheral region of the head pipe 10, and thereby an upper position of the down tube 12 is restricted. Under this condition, the down tube 12 is welded to the head pipe 10.

As shown in FIG. 7, a region 56 of the down tube 12 is welded to the lower tongue portion 43 of the down tube tongue portion 41 along a lower peripheral region of the lower tongue portion 43. In addition, a region 57 of the down tube 12 is welded to the lower tongue portion side walls 43A along rear peripheral regions of the lower tongue portion side walls 43A. Further, a region 58 of the down tube 12 is welded to the main frame 11 along a peripheral region of the second end face 12B so that the down tube 12 is directly coupled to the main frame 11. Thus, the head pipe 10 and the down tube 12 are firmly coupled to each other.

As shown in FIG. 2, in this embodiment, a gusset 60 is provided to couple the main frame 11 and the down tube 12 to each other more firmly. The gusset 60 is disposed in a space that is located behind the head pipe 10 and is defined by a front portion of the main frame 11 and an upper portion of the down tube 12. The gusset 60 is directly welded to the main frame 11 and the down tube 12. Thereby, the head pipe 10, the main frame 11, and the down tube 12 are coupled to each other more firmly, and their coupled regions have sufficient strength.

As thus far described, the head pipe 10 of this embodiment 1 is manufactured by forging such that the head pipe 10 achieves suitable stiffness and is lightweight. The head pipe 10 entirely has an optimized shape. The head pipe 10 may alternatively be manufactured by casting such as die casting, as well as by forging. Furthermore, the frames may be manufactured by other suitable methods using a mold.

The present invention is applicable to cruising or touring type motorcycles, road racer motorcycles, and other two-wheeled vehicles, as well as to the above mentioned motocross motorcycles. Moreover, it will be appreciated that the head pipe of the present invention may be coupled to a main frame having a single main frame member, as opposed to the left and right main frame members described above, or to two down tubes as opposed to one.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A body frame of a two-wheeled vehicle comprising:
a head pipe to which a steering shaft extending substantially vertically is rotatably mounted, the head pipe supporting a front portion of a main frame extending substantially forward and rearward of a vehicle body of the two-wheeled vehicle and supporting an upper portion of a down tube extending substantially vertically,
the head pipe including:
an upper head pipe disposed on an upper side in an axial direction of the steering shaft, the upper head pipe having a taper portion at an outer peripheral region of a lower end portion thereof; and
a lower head pipe disposed on a lower side in the axial direction of the steering shaft, the lower head pipe having a taper portion at an outer peripheral region of an upper end portion thereof, the taper portion of the upper head pipe and the taper portion of the lower head pipe forming a groove extending in a circumferential direction of the head pipe with the upper head pipe and the lower head pipe in contact with each other, and the upper head pipe and the lower head pipe being molded and coupled to each other and welded to each other along the groove;
wherein the upper head pipe includes an upper tubular portion into which the steering shaft is inserted and a main frame tongue portion that extends rearward from the upper tubular portion along an outer wall surface of the front portion of the main frame and supports a front portion of the main frame from above; and
wherein the lower head pipe includes a lower tubular portion into which the steering shaft is inserted and a down tube tongue portion that extends downward from the lower tubular portion along an outer wall surface of the upper portion of the down tube and supports an upper portion of the down tube from forward.

2. The body frame of a two-wheeled vehicle according to claim 1, wherein the upper head pipe has a taper portion at an outer peripheral region of a lower end portion thereof and the lower head pipe has a taper portion at an outer peripheral region of an upper end portion thereof, the taper portion of the upper head pipe and the taper portion of the lower head pipe form a groove extending in a circumferential direction of the head pipe with the upper head pipe and the lower head pipe in contact with each other, and the upper head pipe and the lower head pipe welded to each other along the groove.

3. The body frame of a two-wheeled vehicle according to claim 1, wherein the upper head pipe has a taper portion at an outer peripheral region of a lower end portion thereof and the lower head pipe has a taper portion at an outer peripheral region of an upper end portion thereof, the taper portion of the upper head pipe and the taper portion of the lower head pipe form a groove extending in a circumferential direction of the head pipe with the upper head pipe and the lower head pipe in contact with each other, and the upper head pipe and the lower head pipe welded to each other along the groove.

4. The body frame of a two-wheeled vehicle according to claim 1,
wherein the main frame tongue portion includes an upper tongue portion of a flat plate shape having a width substantially equal to that of the upper tubular portion; and
wherein the down tube tongue portion has a width substantially equal to that of the lower tubular portion.

5. A body frame of a two-wheeled vehicle, comprising:
a head pipe to which a steering shaft extending substantial vertically is rotatably mounted, the head pipe supporting a front portion of a main frame extending substantially forward and rearward of a vehicle body the two-wheeled vehicle and supporting an upper portion of a down tube extending substantially vertically;
wherein the head pipe includes:
an upper head pipe disposed on an upper side in an axial direction of the steering shaft; and a lower head pipe disposed on a lower side in the axial direction of the steering shaft the upper head pipe and the lower head pipe hem molded and counted to each other;

wherein the upper head pipe includes an upper tubular portion into which the steering shaft is inserted and a main frame tongue portion that extends rearward from the upper tubular portion along an outer wall surface of the front portion of the main frame and supports a front portion of the main frame from above;

wherein the lower head pipe includes a lower tubular portion into which the steering shaft is inserted and a down tube tongue portion that extends downward from the lower tubular portion along an outer wail surface of the upper portion of the down tube and supports an upper portion of the down tube from forward; and wherein the main frame tongue portion has a concave portion that is recessed upward at a lower region thereof.

6. A body frame of a two-wheeled vehicle, comprising:

a head pipe to which a steering shaft extending substantially vertically is rotatablv mounted, the head pipe supporting a front portion of a main frame extending substantially forward and rearward of a vehicle body of the two-wheeled vehicle and supporting an upper portion of a down tube extending substantially vertically;

wherein the head pipe includes:
an upper head pipe disposed on an upper side in an axial direction of the steering shaft; and
a lower head pipe disposed on a lower side in the axial direction of the steering shaft, the upper head pipe and the lower head pipe being molded and coupled to each other;

wherein the upper head pipe includes an upper tubular portion into which the steering shaft is inserted and a main frame tongue portion that extends rearward from the upper tubular portion along an outer wall surface of the front portion of the main frame and supports a front portion of the main frame from above;

wherein the lower head pipe includes a lower tubular portion into which the steering shaft is inserted and a down tube tongue portion that extends downward front the lower tubular portion along an outer wall surface of the upper portion of the down tube and supports an upper portion of the down tube from forward;

wherein the main frame tongue portion of the upper head pipe includes a left frame tongue portion for supporting a left main frame member of the main frame from above, a right frame tongue portion far supporting a right main frame member of the main frame from above, and an inner frame support portion that extends downward from a region between the left frame tongue portion and the right frame tongue portion and laterally supports the left main frame member and the right main frame member from an inner side;

wherein the upper head pipe includes an upper tongue portion of a flat plate shape, and a left upper tongue portion side wall and a right upper tongue portion side wall which extend downward from a left side portion and a right side portion of the upper tongue portion, respectively, and cover the left main frame member and the right main frame member laterally from outward, wherein the lower head pipe includes a lower tongue portion and plate-shared outer main frame support portions which are provided at an upper region of the lower tubular portion and cover front end portions of the main frames laterally from outward, and wherein the upper bead pipe and the lower head pipe are welded along a connecting line connecting the upper tongue portion side walls to the outer main frame support portions.

7. A body frame of a two-wheeled vehicle, comprising:

a head pipe to which a steering shaft extending substantially vertically is rotatably mounted, the head pipe supporting a front portion of a main frame extending substantially forward and rearward of a vehicle body of the two-wheeled vehicle and supporting an upper portion of a down tube extending substantial vertically;

wherein the head pipe includes:
an upper head pipe disposed on an upper side in an axial direction of the steering shaft; and
a lower head pipe disposed on a lower side in the axial direction of the steering shaft, the upper head pipe and the lower head pipe being molded and coupled to each other;

wherein the upper head pipe includes an upper tubular portion into which the steering shaft is inserted and a main frame tongue portion that extends rearward from the upper tubular portion along an outer wall surface of the front portion of the main frame and supports a front portion of the main frame from above;

wherein the lower head pipe includes a lower tubular portion into which the steering shaft is inserted and a down tube tongue portion that extends downward from the lower tubular portion along an outer wall surface of the upper portion of the down tube and supports an upper portion of the down tube from forward; and wherein the down tube tongue portion of the lower head pipe has a horizontal cross-section that is channel-shaped to be recessed forward so as to cover an upper portion of the down tube from a front and side.

8. A body frame of a two-wheeled vehicle, comprising:

a head pipe to which a steering shaft extending substantially vertically is rotatably mounted, the head pipe supporting a front portion of a main frame extending substantially forward and rearward of a vehicle body of the two-wheeled vehicle and supporting an upper portion of a down tube extending substantially vertically;

wherein the head pipe includes:
an upper head pipe disposed on an upper side in an axial direction of the steering shaft; and
a lower head pipe disposed on a lower side in the axial direction of the steering shaft, the upper head pipe and the lower head pipe being molded and coupled to each other;

wherein the upper head pipe includes an upper tubular portion into which the steering shaft is inserted and a main frame tongue portion that extends rearward from the upper tubular portion along an outer wall surface of the front portion of the main frame and supports a front portion of the main frame from above;

wherein the lower head pipe includes a lower tubular portion into which the steering shaft is inserted and a down tube tongue portion that extends downward from the lower tubular portion alone an outer wall surface of the upper portion of the down tube and supports an upper portion of the down tube from forward; and wherein the main frame tongue portion includes an upper tongue portion of a flat plate shape, and a left upper tongue portion side wall and a right upper tongue portion side wall extending downward from a left side portion and a right side portion of the upper tongue portion, respectively, and is open downward and rearward.

* * * * *